United States Patent [19]

Williamson

[11] 4,384,198
[45] May 17, 1983

[54] TIME-SHARED APERTURE DEVICE

[75] Inventor: Robert P. Williamson, Woodside, Calif.

[73] Assignee: The United States of America as represented by the Secretary of the Air Force, Washington, D.C.

[21] Appl. No.: 347,227

[22] Filed: Feb. 9, 1982

[51] Int. Cl.³ .............................................. G01J 1/20
[52] U.S. Cl. ................................ 250/203 R; 356/152
[58] Field of Search ................... 250/203 R; 356/152, 356/5, 141

[56] References Cited

U.S. PATENT DOCUMENTS 1,779,324  10/1930  Long, Jr.
1,816,047  7/1931   Keuffel
4,042,822  8/1977   Brandewie et al. ............. 250/216

Primary Examiner—David C. Nelms
Assistant Examiner—Darwin R. Hostetter
Attorney, Agent, or Firm—Doanld J. Singer; Stanton E. Collier

[57] ABSTRACT

A time-shared aperture device using the laser illuminated target to provide a return wavefront which passes through the optical train and beam expander. The distortions in this return wavefront are sampled by a rotating beam chopper which completely blocks the outgoing beam, thereby preventing scattered laser light in the optical train and beam expander from drowning out the fainter target return. Wavefront analyzers provide an indication of errors present in the optical system so that correction may be applied.

9 Claims, 3 Drawing Figures

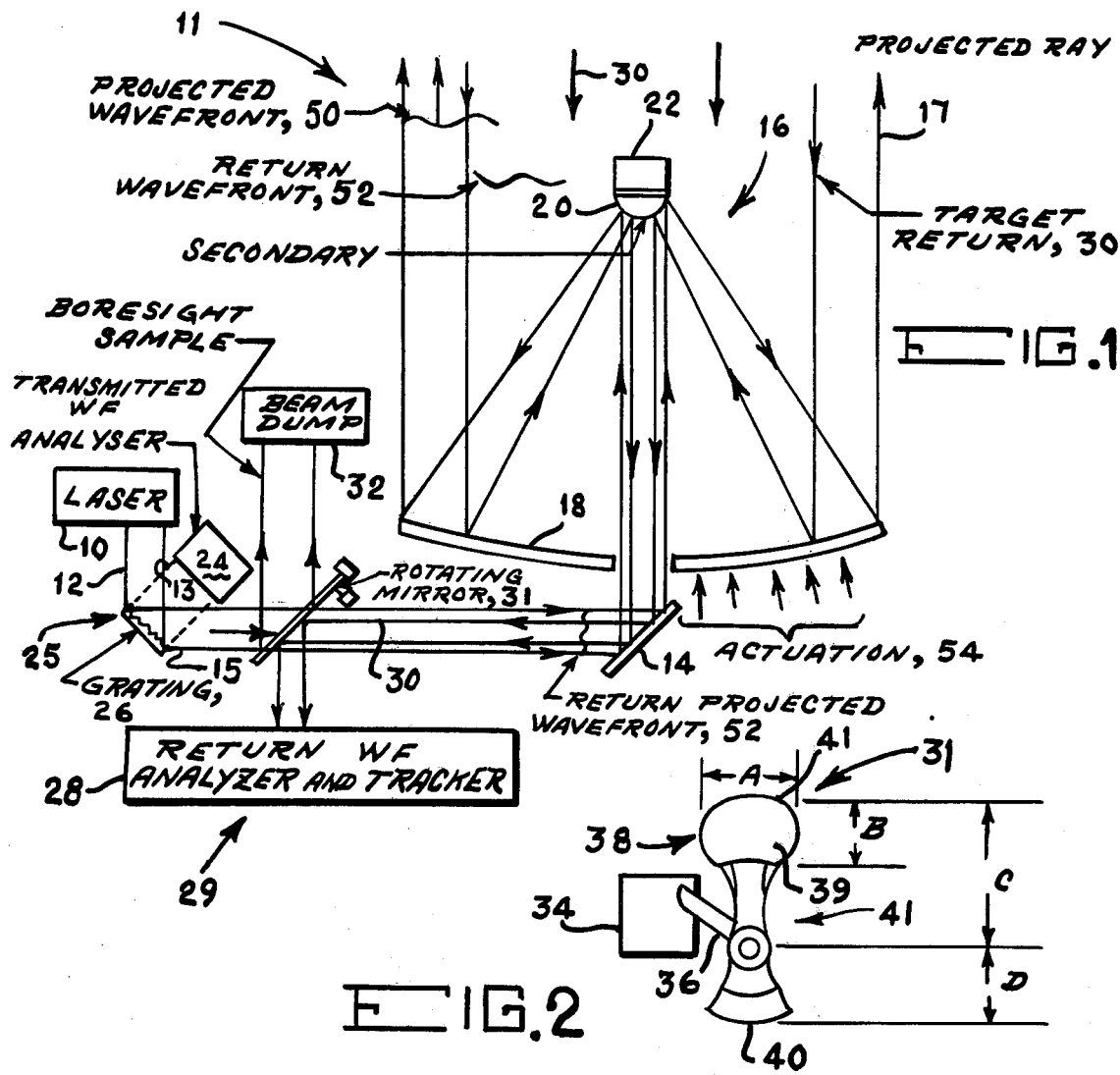
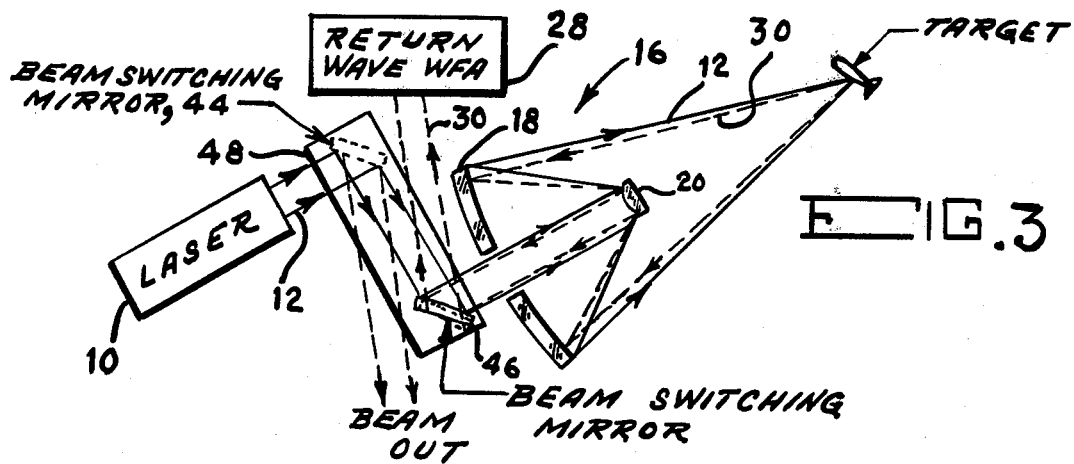

TIME-SHARED APERTURE DEVICE

STATEMENT OF GOVERNMENT INTEREST

The invention described herein may be manufactured and used by or for the Government for governmental purposes and without the payment of any royalty thereon.

BACKGROUND OF THE INVENTION

This invention relates to laser tracking optics, and more particularly, to a beam chopper for use within a time shared aperture device.

There are several means of sampling radiant energy beams. These include spectral-sharing devices using gratings, beam splitters in an optical system or refractive elements, or spatial-sharing devices using different areas of the aperture for beam projection and for return viewing of a portion of the projected beam modified by the presence of a target, etc.

As to the spectral-sharing device, a high energy laser beam reflected by a target is not used for tracking because of interference from scattering of the outgoing beam in the beam expander optics. Instead, an offset wavelength near the laser beam wavelength is used for tracking, etc. The return having this offset wavelength is created either by an independent laser illuminator or the spectrum spreading of the laser beam off the target. This offset wavelength returns through the same aperture as the outgoing laser beam thus resulting in spectral-sharing of the same aperture.

In particular, a prior art spectral-sharing device has a high energy laser that emits a beam which is incident on a first reflective grating. The laser beam is further incident upon a second reflective grating. A portion of the beam incident upon the second reflective grating is reflected into a waveform analyzer, and the remaining portion is transmitted through beam expander optics. If a target is within the transmitted beam, a portion is returned through the beam expander optics. Because of the above problem with interference, an offset wavelength different than the transmitted wavelength is analyzed. The waveform analyzer of the returned beam receives the returned beam off the second grating. Because of the offset wavelength, the target source can be weak and undependable especially against a background of other sources of radiation such as stars, atmospheric condition, etc.

A spatial-sharing device has a high energy laser that emits a laser beam into an optical train. From the optical train, the beam goes into a beam expander. A target return, having the same wavelength as the laser beam, traverses the same beam expander and optical train. A means is furnished so that the target return is analyzed but this analyzing means remains in the optical path of the laser beam all of the time so that there is a reduction in the size of the aperture useable by the laser beam.

Each of the above devices have disadvantages. One receives a target return at an offset wavelength. The target source reflects a return which can be weak and undependable especially against an unpredictable background. This limits the bandwidth of the target return and the precision obtainable for sensing figure errors and tracking. The other device receives a target return at the laser wavelength. The analyzing means for the target return blocks part of the aperture that could be used by the outgoing laser beam. This reduces the intensity of the laser beam that reaches the target.

SUMMARY OF THE INVENTION

A time-shared aperture device minimizes the problems noted in prior art devices by receiving a target return at the laser beam wavelength and only interrupts, i.e., blocks, the laser beam when a target return is present in the optical train.

When projecting a laser beam towards a target one must sense the errors in the optical train and beam expander which distort the outgoing beam so that corrections may be applied. A time-shared aperture device uses the laser illuminated target to provide a return wavefront which passes through the optical train and beam expander. The distortion in this return wavefront is sampled by either a rotating beam chopper or beam switching mirrors which completely block the outgoing beam from interferring with the return wavefront, thus preventing scattered outgoing laser radiation in the optical train and beam expander from drowning out the much fainter target return. Wavefront analysis of the return wave provides an indication of errors present in the optical system so that corrections may be applied.

To accomplish the above, the time-shared aperture device requires a high energy laser, an optical train, a beam expander, waveform analyzers, and a beam chopper. A return from the target is intermitently sampled by the beam chopper. The return waveform analyzer that receives the return provides the necessary information about boresight, tracking, and figure sensing. The beam chopper of this invention is either a rotating beam chopper having two mirrored sides or a pair of beam switching mirrors in the optical train.

One object of this invention is to provide a time-shared aperture device.

Another object of this invention is to provide a wavefront sample of a target return with the return radiation using the same optical path as the outgoing beam.

A further object of this invention is to provide means for measuring figure and alignment errors of a beam expander and an optical train using a return from a target.

A still further object of this invention is to provide means for target imaging using the laser illumination of the target and the full aperture of the time-shared aperture device of this invention.

Other objects, advantages, and novel features of the invention will become apparent from the following description of the invention when considered in conjunction with the accompanying drawings.

BRIEF DESCRIPTION OF THE DRAWINGS

FIG. 1 is a schematic representation of the time-shared aperture device of this invention incorporated within a part of a laser tracking system;

FIG. 2 is a view of a rotating beam chopper of this invention; and

FIG. 3 is an alternative schematic representation of the time-shared aperture of this invention using beam switching mirrors.

DETAILED DESCRIPTION OF THE PREFERRED EMBODIMENT

This invention is directed to a time-shared aperture device having means for sampling a high power output laser beam and simultaneously diverting the return from a target at the laser wavelength to a separate sensor.

The chopping of the sampled output beam is necessitated to prevent scattered light from drowning out the relatively weak target return at the same wavelength. The chopping and sampling is accomplished by a rotating chopper or beam switching mirrors.

Referring to FIG. 1, a time-shared aperture device 11 is diagrammatically illustrated; included therein is a high power laser 10 outputting a conventional laser beam 12, a mirror 14 representing the optical train and beam steering mirrors, a beam expander 16 having a primary concave reflective mirror 18 and a secondary mirror 20, jitter sensor means 22, first analyzing means 25 including transmitted waveform analyzer 24 and a weak reflective grating sampler 26, second analyzing means 29 including a return waveform analyzer and tracker 28 and a beam chopper 31, and lastly a beam dump device 32.

Laser 10 is of conventional design and outputs a high power laser beam 12. Beam 12 is firstly incident upon weak grating sampler 26. A sampled beam 13, a small portion of laser beam 12, is reflected from grating 26 into transmitted waveform analyzer 24 of conventional design. An output beam 15, a large portion of laser beam 12, is reflected from grating 26 into beam chopper 31. Beam chopper 31 either allows beam 15 to pass without interruption or reflects beam 15 into a conventional beam dump 32. Otherwise uninterrupted beam 15 is then incident on mirror 14 which directs beam 15 into beam expander 16. Beam 15 is reflected off secondary mirror 20 into primary mirror 18, and exits time-shared aperture device 11 as expanded beam 17.

If expanded beam 17 hits a target (not shown), a target return 30 enters beam expander 16. Return 30 is reflected from primary mirror 18 to secondary mirror 20, from secondary mirror 20 to mirror 14, and from mirror 14 to beam chopper 31. Return 30 is reflected by beam chopper 31 into return waveform analyzer and tracker 28. Of course, it is understood that return 30 is present when beam chopper 31 is interrupting beam 15. As such, the range of the target is limited by the rotational frequency of beam chopper 31.

A preferred embodiment of beam chopper 31 is illustrated in FIG. 2. Beam chopper 31 includes a motor 34 for rotational movement, a drive shaft 36, a rotatable support 41 having a paddle 38 with two mirrors 39 and 41 (only one shown), and a counterweight 40. Counterweight 40 does not interfere with laser beam 15 during rotation.

If beam 15 has a twenty centimeter diameter, preferable dimensions of beam chopper 31 as shown in FIG. 2 are forty cm. for "A", thirty two cm. for "B", seventy five cm. for "C", and forty two cm. for "D". These dimensions are illustrative only of a preferred embodiment as shown.

Mirrors 39 and 41 are substantially parallel with a reflective coating on each, such as beryllium. A reflectivity of approximately 99.8% is desirable.

Motor 34 can rotate beam chopper 31 at approximately 3000 revolutions per minute for the particular ranges involved. The rotational frequency is, of course, adjustable. Counterweight 40 and paddle 38 are dynamically balanced on shaft 36.

Beam chopper 31 as disclosed has an advantage of not blocking output beam 15 except when return 30 should be present; another advantage is the clear aperture for target imaging, i.e. no high energy laser stray light; and another advantage of having a large aperture available for tracking.

An alternative embodiment of the invention is shown in FIG. 3. For ease of understanding, the same reference numerals will be used in FIGS. 1 and 3 to identify identical elements.

Still referring to FIG. 3, a pair of beam switching mirrors, a first mirror 44 and a second mirror 46, are mounted on rotating means 48 of conventional design to cause the movement thereof in a predetermined manner. First mirror 44 has a reflective coating on one side which is firstly positioned at an angle of forty five degrees to beam 12. This first position corresponds to no beam chopping, i.e., laser beam 12 is being transmitted through beam expander 16. In a second position, only a few degrees of rotation from the first position, laser beam 12 is being dumped.

Second mirror 46 has a reflective coating on one side which is facing the reflective coating of first mirror 44. Second mirror 46 is parallel to first mirror 44. In the first position, mirror 46 is at a forty five degree angle relative to beam 12 reflected from first mirror 44. In the second position, mirror 46 is rotated so that any light incident thereon from beam expander 16 is reflected into return waveform analyzer 28. Mirror 44 and 46 rotate in the same direction together and have their mirrored surfaces parallel during such rotation. It should be understood that the switching period is related to the range at which targets will be detected. The switch to the second position must occur when the target return reaches mirror 46.

OPERATION

Referring to FIG. 1, laser 10 emits beam 12 for illuminating a target in a given range. Beam 12 is incident on sampling grating 26, and sampled beam 13 and output beam 15 are reflected therefrom. Sampled beam 13 is input to transmitted waveform analyzer 24 wherein the wavefront of laser beam 12 is shape analyzed by conventional means. Output beam 15 is either incident on one mirror of beam chopper 31 or on mirror 14. If output beam 15 is incident on one mirror of beam chopper 31, it is thereafter input into beam dump 32. If output beam 15 is incident on mirror 14, beam 15 is thereafter input into beam expander 18. Expanded beam 17 having a projected wavefront 50 modified by the intervening optics is output by beam expander 18 to fall upon a target. If beam 17 falls upon a target in a given range, return 30 having return wavefront 52 enters beam expander 16, reflects from mirror 14 and is incident on the other mirror of beam chopper 31 and is reflected into return waveform analyzer and tracker 28. By comparing projected wavefront 50 with return wavefront 52 correction to figure sensing is possible. Further, tracking information developed by conventional techniques is used to drive actuation forces 54 on beam expander 16.

Obviously, many modifications and variations of the present invention are possible in light of the above teachings and it is therefore understood that, within the scope of the disclosed inventive concept, the invention may be practiced otherwise than specifically described.

What is claimed is:

1. A time-shared aperture device for boresight, tracking, and figure sensing comprising:
   means for emitting a high power laser beam;
   means optically aligned with said laser beam emitting means for analyzing a sample of said laser beam;

means optically aligned with said laser beam emitting means for analyzing a return of said laser beam reflected from a target;

an optical train for guiding said laser beam and said target return;

a beam expander for operably receiving said laser beam from said optical train and transmitting said laser beam to said target, said expander receiving said target return and transmitting said return to said optical train; and means for sensing jitter of said laser beam.

2. A time-shared aperture device as defined in claim 1, wherein said return beam analyzing means includes a return wavefront analyzer and tracker, and a beam chopper.

3. A time-shared aperture device as defined in claim 2, wherein said beam chopper comprises:

a rotatable support having two mirrors fixedly secured to one end of said support;

a counterweight fixedly secured to the other end of said support; and means operably connected to said support for rotating said support at a predetermined rate.

4. A time-shared aperture device as defined in claim 3, wherein said rotating means comprises a shaft fixedly secured to said support, a motor fixedly secured to the other end of said shaft, and the length from said shaft to said counterweight is less than a length from said shaft to said mirrors such that said counterweight does not interfere with said laser beam upon rotation of said support by said motor.

5. A time-shared aperture device as defined in claim 3, wherein said two mirrors are planar and are substantially parallel to each other.

6. A time-shared aperture device as defined in claim 5, wherein said two mirrors interrupt the laser beam so that the laser beam is incident at a 45° angle to the planar surfaces, one of said mirrors reflecting said laser beam into a beam dump and analyzer.

7. A time-shared aperture device as defined in claim 6, wherein said other mirror reflects a target return into said return beam analyzing means, and simultaneously said laser beam is reflected into said beam dump and analyzer.

8. A time-shared aperture device as defined in claim 2, wherein said beam chopper comprises a first mirror, a second mirror, and rotating means having said first and second mirrors mounted thereon such that said first and said second mirrors rotate between a first and a second position on command, said first and said second mirror are rotatably mounted on said rotating means such that adjacent parallel mirrored surfaces of said first and second mirror move simultaneously in a parallel manner.

9. A time-shared aperture device as defined in claim 8, wherein said mirrors in the first position reflect the laser beam to said beam expander, and in the second position reflect a target return to said return beam analyzing means and said laser beam to a beam dump and analyzer, neither beam interferring with the other.

* * * * *